United States Patent [19]

Li et al.

[11] Patent Number: 5,544,279

[45] Date of Patent: Aug. 6, 1996

[54] FUZZY LOGIC RECOGNITION DEVICE WHICH DETERMINES THE MODE OF AN UNKNOWN MOVE USING FUZZY SET THEORY

[75] Inventors: Zhi-Jian Li; Bing-Xue Shi; Bin-Qiao Li, all of Beijing, China

[73] Assignee: United Microelectronics Corp., Hsinchu, Taiwan

[21] Appl. No.: 322,580

[22] Filed: Oct. 13, 1994

[51] Int. Cl.⁶ .............................. G06G 7/00; G06F 17/00
[52] U.S. Cl. .............................. 395/3; 382/186; 382/187; 382/198; 382/228; 382/229; 395/61
[58] Field of Search ......................... 395/3, 61; 382/186, 382/187, 198, 228, 229

[56] References Cited

U.S. PATENT DOCUMENTS

| | | | |
|---|---|---|---|
| 5,179,624 | 1/1993 | Amano et al. | 392/2 |
| 5,392,367 | 2/1995 | Hsu et al. | 382/39 |
| 5,426,711 | 6/1995 | Kitamura | 382/187 |
| 5,432,868 | 7/1995 | Obata et al. | 382/187 |
| 5,479,533 | 12/1995 | Tanaka | 382/161 |

OTHER PUBLICATIONS

Sasaki, M. et al, "Fuzzy Multiple-Input Maximum and Minimum Circuits in Current Mode and their Analysis Using Bounded-Difference Equations," IEEE Trans. on Computers V. 39, N. 6, 1990, pp. 768-774.

*Primary Examiner*—Robert W. Downs
*Assistant Examiner*—A. Katbab
*Attorney, Agent, or Firm*—Curtis, Morris & Safford, P.C.

[57] ABSTRACT

A fuzzy logic recognition device has a plurality of sets of feature extraction windows, each set storing the predetermined features for one feature class therein, and comparing the stored features with the corresponding features of an unknown recognition mode to output a logic "1" via one corresponding feature extraction window where an identicalness condition occurs, and logic "0" via the other feature extraction windows where no identicalness condition occurs. A plurality of sets of membership function generators are coupled to the feature extraction window sets respectively. Each membership function generator which receives the logic "1" generates the memberships of the corresponding feature with respect to the target modes, and the membership function generators which receive the logic "0" do not generate the memberships. A minimum gate is coupled to the membership function generator sets for comparing the memberships with respect to the same target mode, respectively, and for outputting the smallest membership for every one of the target modes. A maximum gate is coupled to the minimum gate for comparing the memberships outputted from the minimum gate means, and for outputting the largest membership to indicate that the unknown recognition mode is which one of the target mode.

10 Claims, 2 Drawing Sheets

ND DETERMINES THE MODE OF AN
FUZZY LOGIC RECOGNITION DEVICE WHICH DETERMINES THE MODE OF AN UNKNOWN MOVE USING FUZZY SET THEORY

BACKGROUND OF THE INVENTION

The present invention relates to a fuzzy logic recognition device, and more particularly to a high-speed and high-efficiency fuzzy logic recognition device which is very suitable for fabrication with MOS (Metal-Oxide-Semiconductor) technology.

Fuzzy set theory was introduced by Zadeh in the literature "Fuzzy Sets," *Inform. Contr.,* vol. 8, pp. 338–358, 1965. A feature of this theory is that uncertain linguistic information can be handled quantitatively by using membership functions. Advances in the fuzzy set theory have brought about its applications to an extensive field employing digital computers, or binary logic hardware systems. For example, the following papers show that the theory has been effectively applied to automatic controls and expert systems:

(1) L. P. Holmbiad and J. J. Ostergraard, "Control of a Cement Kiln by Fuzzy Logic," in *Fuzzy Information and Decision Processes.* Amsterdam, The Netherlands: North-Holland, 1982, pp. 389–399.

(2) O. Yagishita, O. Itoh, and M. Sugeno, "Application of Fuzzy Reasoning to the Water Purification Process," *Syst. Contr. Japan,* vol. 28, pp. 597–604, Oct. 1984.

(3) S. Yasunobu, S. Miyamoto, and H. Ihara, "A Predictive Fuzzy Control for Automatic Train Operation," *Syst. Contr. Japan,* vol. 28, pp. 605–613, Oct. 1984.

(4) M. Sugeno and K. Murakami, "Fuzzy Parking Control of Model Car," in *Proc. 23rd Conf. Decision Contr.,* 1984, pp. 902–903.

Although fuzzy information processing employing a digital computer is useful for many purposes according to programming, it is not so effective with respect to speed of processing, power dissipation, functional density, design and fabrication cost, and so on. Accordingly, integrated hardware systems peculiar to fuzzy information processing will be needed for real-time use.

SUMMARY OF THE INVENTION

The primary object of the present invention is to provide a high-speed and high-efficiency fuzzy logic recognition device which is very suitable for fabrication with MOS technology.

In accordance with the present invention, a fuzzy logic recognition device for recognition of an unknown recognition mode as which one of a plurality of target modes, wherein a plurality of predetermined feature classes are selected for the unknown recognition and target modes, and a plurality of predetermined features are selected for each feature class for the target modes, each predetermined feature having a membership with respect to each target mode, the fuzzy logic recognition device comprises:

a plurality of sets of feature extraction window means, each set of feature extraction window means storing the predetermined features for one feature class therein, and comparing the stored features with the corresponding features of the unknown recognition mode to output a positive signal via one corresponding feature extraction window means where an identicalness condition occurs, and negative signals via the other feature extraction window means where no identicalness condition occurs;

a plurality of sets of membership function generators coupled to the sets of feature extraction window means respectively, each membership function generator that receives the positive signal generating the memberships of the corresponding predetermined feature with respect to the target modes, and the membership function generators that receive the negative signals not generating the memberships;

a minimum gate means, coupled to the membership function generator sets, for comparing the memberships with respect to the same target mode, respectively, and for outputting the smallest membership for every one of the target modes; and a maximum gate means, coupled to the minimum gate means, for comparing the memberships outputted from the minimum gate means, and for outputting the largest membership to indicate that the unknown recognition mode is which one of the target modes.

According to one aspect of the present invention, the fuzzy logic recognition device further comprises a plurality of NOR gates, and a plurality of unit feature membership function generators connected respectively between the NOR gates and the minimum gate. Each NOR gate is connected to the outputs of one corresponding feature extraction window means set at its input terminals to generate a logic high signal when the outputs of the one feature extraction window means set are all the negative signal, and then the logic high signal activates one corresponding unit feature membership function generator to generate a plurality of unit memberships with respect to the target modes.

According to another aspect of the present invention, each of the membership function generators is implemented by a membership function generating circuit including a PMOS model transistor, a plurality of PMOS mirror transistors, and an NMOS control transistor with its gate electrode controlled by the output of the corresponding feature extraction window means, its source electrode connected to ground, and its drain electrode connected to the gate and drain electrodes of the model transistor. The model and mirror transistors are connected in parallel with their source electrodes connected to a power source and their gate electrodes connected together, and the channel lengths and the channel widths of the mirror transistors are respectively adjusted with respect to the channel length and the channel width of the model transistor, so that the mirror currents presented at the drain electrodes of the mirror transistors can represent the memberships of the corresponding feature with respect to the target modes.

According to a further aspect of the present invention, each of the unit feature membership function generators is implemented by a membership function generating circuit including a PMOS model transistor, a plurality of PMOS mirror transistors, and an NMOS control transistor with its gate electrode controlled by the output of the corresponding NOR gate, its source electrode connected to ground, and its drain electrode connected to the gate and drain electrodes of the model transistor. The model and mirror transistors are connected in parallel with their source electrodes connected to a power source and their gate electrodes connected together, and the mirror transistors have the same channel length and channel width, so that the mirror currents presented at the drain electrodes of the mirror transistors can represent the unit memberships with respect to the target modes.

According to yet another aspect of the present invention, the fuzzy logic recognition device further comprises a current-to-voltage converter coupled to the maximum gate means in order to convert the current mode of the output of the maximum gate into a voltage mode. The predetermined features are represented in binary form. The fuzzy logic recognition device may further comprises means, coupled to the maximum gate means, for generating a threshold current to be compared with the memberships in the maximum gate means, and the maximum gate means outputs logic "0" signals to indicate that the recognition is rejected when the memberships are all smaller than the threshold current.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
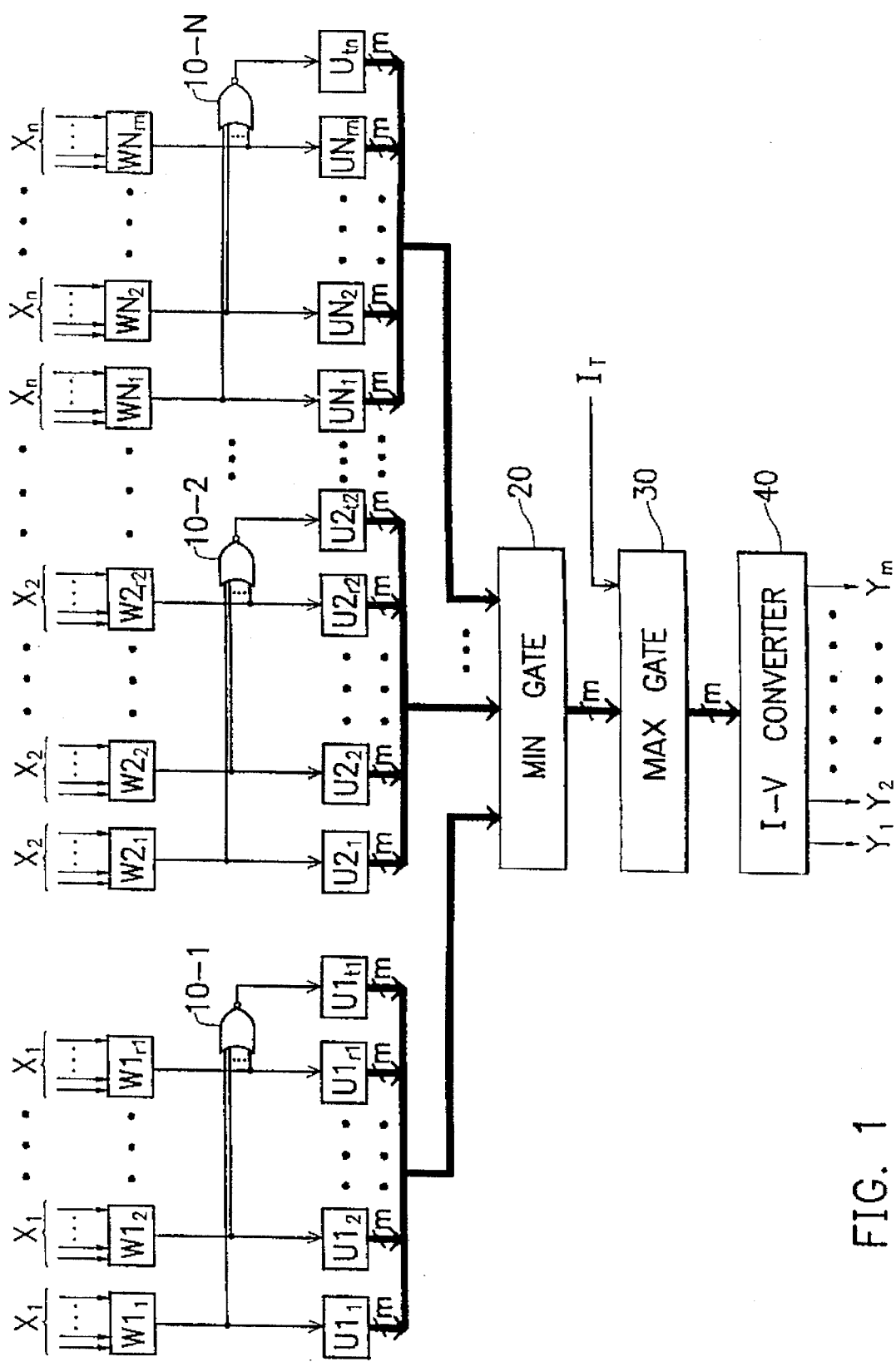
FIG. 1 is a schematic block diagram of a fuzzy logic recognition device according to one preferred embodiment of the present invention.

Referring now to FIG. 1, there is shown a fuzzy logic recognition device according to one preferred embodiment of the present invention. The fuzzy logic recognition device includes N sets of feature extraction windows W1 through WN, N sets of membership function generators U1 through UN connected to the feature extraction window sets W1 through WN respectively, N unit feature membership function generators $U_{r1}$ through $U_{tn}$, N NOR gates 10-1 through 10-N with their inputs connected to the feature extraction window sets W1 through WN and its outputs connected to the unit feature membership function generators $U_{r1}$ through $U_{tn}$, respectively, a minimum (MIN) gate 20 connected to the outputs of the membership function generators U1 through UN and the unit feature membership function generators $U_{r1}$ through $U_{tn}$, a maximum (MAX) gate 30 connected to the MIN gate 20, and a current-to-voltage (I-V) converter 40 connected to the MAX gate 30.

Figure 3:
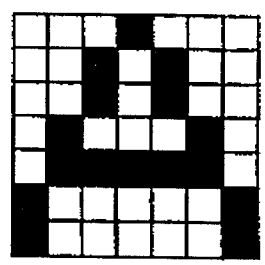
FIG. 3 is a schematical diagram of an English alphabet "A" represented by 7×7 array of binary pixels.

The fuzzy logic recognition device of the present invention can be used for image and speech recognition. In application, the fuzzy information of an unknown recognition mode is inputted into the fuzzy logic recognition device, and the fuzzy logic recognition device determines which of the target modes the unknown recognition mode is most likely to be. For example, the fuzzy logic recognition device may be used for recognition of 26 handwriting English alphabets "A" through "Z", i.e. the target modes, and the English alphabets are represented by an array of binary pixels, i.e. white and black pixels. Referring to FIG. 3, there is shown an English alphabet "A" represented by a 7×7 array of binary pixels. The white pixel may be represented by a logic "0" signal while the black pixel may be represented by a logic "1" signal. In this way, the recognition modes, the target modes and theirs features can be represented by binary signals. A certain number of feature classes are determined for the target modes. Then, a certain number of features are selected for each feature class, and the feature number for different feature class may be different. The feature classes and the features for the target modes and the recognition mode have to be predetermined in advance, for example, by statistics and analysis. For example, a lot of handwriting alphabets may be collected for each English alphabet, and are used to determine/adjust the feature classes, to select/adjust the features, and to calculate/adjust the memberships of each feature with respect to all target modes. If two thousand handwriting alphabets are collected for each English alphabet, one thousand of the handwriting alphabets may be used to determine the feature classes for the target modes, to select the features for each feature class, and to calculate the memberships of each feature with respect to the target modes, and another thousand of the handwriting alphabets may be used to test and adjust the feature classes, the features and the memberships.

In order to easily describe and provide a clear understanding of the fuzzy logic recognition device shown in FIG. 1, we suppose:

(1) The target modes are 26 English alphabets.

(2) The 26 English alphabets are all represented by 7×7 array of binary pixel (3) The second (F1), fourth (F2), and sixth (F3) columns and the third (F4), fourth (F5), and fifth (F6) rows of binary codes, referring to FIG. 3, are the predetermined six feature classes for the target modes and the unknown recognition mode.

(4) Four features, for example F1-1(0101100), F1-2(0011110), F1-3(0011001), and F1-4(1001110), are selected for the second-column or first feature class. Five features, for example F2-1(1011001), F2-2(0101011), F2-3(1101001), F2-4(1001011), F2-5(1100101), and F2-6(1010011), are selected for the fourth-column or second feature class. Four features, for example F6-1(1001110), F6-2(1100011), F6-3(1001011), and F6-4(1101001), are selected for the fifth-row or sixth feature class. The other feature classes are omitted for reasons of brevity.

(5) The memberships of each feature with respect to the 26 target modes are calculated. For example, if the feature F1-1(0101100) occurs 200 times in the collected 1000 handwriting alphabets "A", the membership or membership grade of F1-1 with respective to the target mode "A" is 200/1000=0.2. If the feature F1-1 occurs 400 times in the collected 1000 handwriting alphabets "B", the membership of F1-1 with respective to the target mode "B" is 400/1000= 0.4. If the feature F1-1 occurs 800 times in the collected 1000 handwriting alphabets "Z", the membership of F1-1 with respective to the target mode "Z" is 800/1000=0.8. The other memberships of all features are calculated in the same manner.

According to this supposition, the variable numbers shown in the drawings and this specification are:

(1) N or n=6. (i.e. feature class number.)

(2) M or m=26. (i.e. target mode number.)

(3) r1=4; r2=5; and rn=4. (i.e. feature numbers for respective feature classes.)

Referring again to FIG. 1, the N sets of feature extraction windows W1 through WN have similar structures, and thus the first set of feature extraction windows W1 is described first. The first feature extraction window set W1 includes r1 feature extraction windows $W1_1$ through $W1_{r1}$ in which the r1 features of the first feature class are stored respectively. In this example, the features F1-1 through F1-4 are stored in the feature extraction windows $W1_1$ through $W1_{r1}$ respectively. The second through Nth sets of feature extraction windows W2 through WN are all similar to the first set of feature extraction windows W1, and the only two differences are the numbers of the feature extraction windows and the features stored therein. For example, the second feature extraction window set W2 includes r2 feature extraction windows $W2_1$ through $W2_{r2}$ in which the r2 features of the second feature class are stored respectively. The Nth feature extraction window set WN includes m feature extraction windows $WN_1$ through $WN_m$ in which the m features of the Nth feature class are stored respectively. The binary code signal $X_1$ of the first feature class of one unknown recognition mode, e.g. the second-column binary code of the recognition mode, is inputted into each first feature extraction window $W1_1 \sim W1_{r1}$ for comparisons with the stored features for the first feature class. If the binary code signal $X_1$ is identical to one stored feature, the corresponding feature extraction window outputs a logic "1" signal. If the binary code signal $X_1$ is different from the stored features, the corresponding feature extraction windows output logic "0" signals. Similarly, the binary code signal $X_2$ of the second feature class, e.g. the fourth-column binary code, of the unknown recognition mode is inputted into each second feature extraction window $W2_1 \sim W2_{r2}$ for comparison with the stored features for the second feature class, and the binary code signal $X_n$ of the Nth feature class, e.g. the fifth-row binary code, of the recognition mode is inputted into each Nth feature extraction window $WN_1 \sim WN_m$ for comparison with the stored features for the Nth feature class. It should be understood by those skilled in the art that the feature extraction windows of the present invention can be implemented by any suitable software and hardware technologies, depending on the application.

The N sets of membership function generators U1 through UN also have similar structures, and the differences are the numbers of the membership function generators and the membership values generated thereby. For example, the Nth membership function generator set UN includes m membership function generators $UN_1$ through $UN_m$ by which m memberships of each feature of the Nth feature class with respect to the M target modes can be generated respectively. If the outputs of the feature extraction windows are logic "0" signals, the corresponding membership function generators do not generate effective signals. If the outputs of the feature extraction windows are logic "1" signals, the corresponding membership function generators generate m-membership signal at their outputs respectively. Since the features of each feature class are different from each other, only one feature extraction window in each set of feature extraction windows, at most, can generate the membership signal. Each unit feature membership function generator $U_{f1} \sim U_{fn}$ is similar to the membership function generators, the only difference is that its generated membership signal is an m-unit-membership signal, i.e. "111 . . . 111" signal. If all feature extraction windows in one set of feature extraction windows output the logic "0" signals, it means that "no identicalness condition" occurs. The corresponding NOR gate 10-1~10-N outputs logic "1" signal to activate the corresponding unit feature membership function generator $U_{f1} \sim U_{fn}$ to generate the unit membership signal, i.e. "11 . . . 111" signal.

Figure 2:
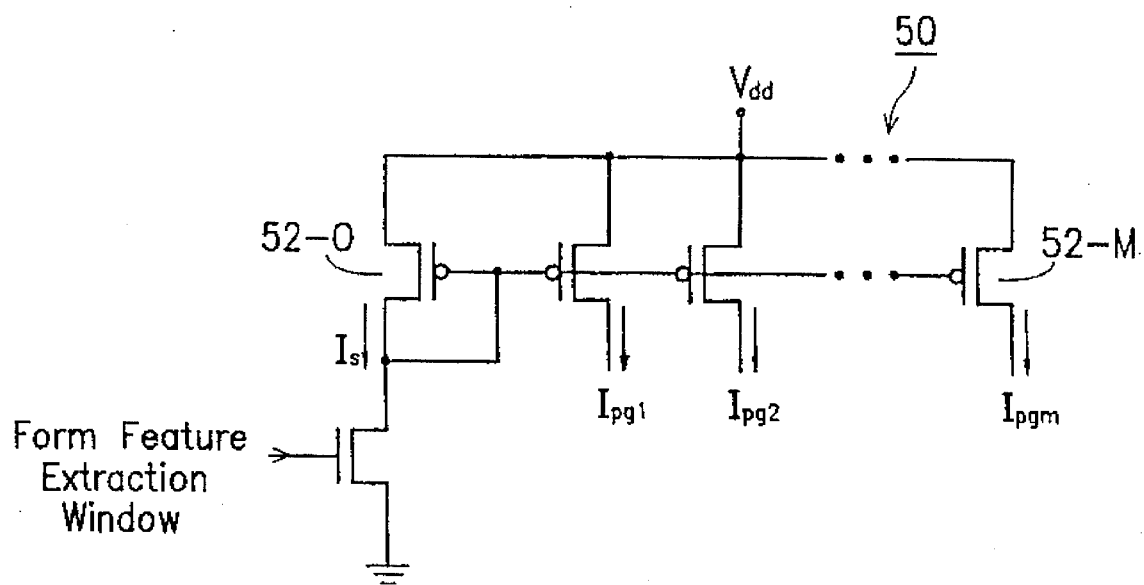
FIG. 2 is a schematically electrical circuit diagram of a membership function generator which can be used in the fuzzy logic recognition device shown in FIG. 1.

Each of the membership function generators and the unit feature membership function generators can be implemented by a current-mode membership function generating circuit 50 shown in FIG. 2. The membership function generating circuit 50 of the present invention includes a PMOS (P-channel Metal-Oxide-Semiconductor) model transistor 52-0, and M PMOS mirror transistors 52-1 through 52-M, and an NMOS control transistor 54 with its drain electrode connected to the drain and gate electrodes of the model transistor 52-0, its source electrode connected to ground, and its gate electrode connected to the output of the feature extraction window, or the output of the NOR gate in case of the unit feature membership function generator. The model transistor 52-0 and the mirror transistors 52-1 through 52-M are connected in parallel with their source electrodes connected to a power source $V_{dd}$ and their gate electrodes connected together. When the output of the feature extraction window is logic "1", the control transistor 54 is turned on, and thus the model and mirror transistors 52-0 through 52-M are turned on. The membership function generating circuit 50 is designed and operated according to the current-mirror principle. The current amounts of the model current $I_s$ in the model transistor 52-0 and the mirror currents $I_{pq1}$ through $I_{pqm}$ in the mirror transistors 52-1 through 52-M depend on the channel widths and channel lengths of the transistors 52-0 through 52-M. Suppose the channel lengths of the transistors 52-0 through 52-M are fixed, and the channel width of the model transistor 52-0 is "D." If the channel width of the mirror transistor 52-1 is 0.5 D, its mirror current $I_{pq1}$ will be 0.5 $I_s$. If the channel width of the mirror transistor 52-2 is 0.8 D, its mirror current $1_{pq2}$ will be 0.8 $I_s$. In this way, the memberships of each feature with respect to the target modes can be properly stored in and generated by the membership function generating circuit 50. The three variable numbers "p", "q" and "m" in the symbol $I_{pqm}$ indicate the membership is generated for which set of the membership function generators, which one of the membership function generators in the membership function generator set, and which one of the target modes.

So far, N sets of memberships are generated by the membership function generators and/or the unit feature membership function generators. Then, the membership signals are inputted into the MIN gate 20. The MIN gate 20 compares the memberships with respect to the same target mode, respectively, and outputs the smallest membership for every one of the target modes. For example, the MIN gate 20 compares the N memberships with respect to the target mode "A," and outputs the smallest one. Similarly, the MIN gate 20 compares the N memberships with respect to the target mode "B," and outputs the smallest one. The smallest memberships for the target modes "C" through "Z" are also selected in the same manner.

The M smallest memberships for the M target modes generated by the MIN gate 20 are then inputted into the MAX gate 30. The MAX gate 30 compares the M smallest memberships, and outputs the largest one at the corresponding output. The other membership signals are decreased to zero by the MAX gate 30, and thus the other outputs of the MAX gate 30 are zero-state signals. The I-V converter 40 converts the current signals sent from the MAX gate 30 into voltage signals at is outputs $Y_1$ through $Y_m$ to indicate which of the target modes the unknown recognition mode is most likely to be. A threshold current $I_T$ may be sent into the MAX gate 30 for joint comparison with the membership signals. If all current-mode membership signals are smaller than the threshold current $I_T$, the M outputs of the MAX gate 30 and thus the outputs $Y_1$ through $Y_m$ of the I-V converter 40 are all zero to indicate that the recognition is rejected. The threshold current $I_T$ may be adjusted in different applications to enhance the recognition rate of the fuzzy logic recognition device of the present invention. The MIN gate 20 and MAX gate 30 may be implemented by any suitable technology, for example the current-mode maximum and minimum circuit technologies disclosed in the literature: M. Sasaki, T. Inoue, Y. Shirai, and F. Ueno, "Fuzzy Multiple-Input Maximum and Minimum Circuits in Current Mode and Their Analyses Using Bounded-Difference Equations," *IEEE Trans. on Computers*, vol. 39, No. 6, June 1990, pp. 768–774.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A fuzzy logic recognition device for recognition of an unknown recognition mode as one of a plurality of target modes, wherein a plurality of predetermined feature classes are selected for the unknown recognition and target modes, and a plurality of predetermined features are selected for each feature class for the target modes, each predetermined feature having a membership with respect to each target mode, said fuzzy logic recognition device comprising:

a plurality of sets of feature extraction window means each for storing the predetermined features for one feature class therein, for comparing the stored features with the corresponding features of the unknown recognition mode, for outputting a positive binary signal via one corresponding feature extraction window means where an identicalness condition occurs, and for outputting negative binary signals via the other feature extraction window means where no identicalness condition occurs;

a plurality of sets of membership function generators for receiving respective outputs of said feature extraction window means, each membership function generator that receives said positive binary signal generating the memberships of the corresponding predetermined feature with respect to the target modes, and the membership function generators that receive said negative binary signals not generating the memberships;

a minimum gate means, coupled to said membership function generator sets, for comparing the memberships with respect to the same target mode, respectively, and for outputting the smallest membership for every one of the target modes; and a maximum gate means, coupled to said minimum gate means, for comparing said memberships outputted from said minimum gate means, and for outputting the largest membership to indicate the unknown recognition mode as one of the target modes.

2. The fuzzy logic recognition device as claimed in claim 1, further comprising a plurality of NOR gates, and a plurality of unit feature membership function generators connected respectively between said NOR gates and said minimum gate, each NOR gate being connected to the outputs of one corresponding feature extraction window means set at its input terminals to generate a logic high signal when the outputs of said one feature extraction window means set are all said negative binary signal, and then said logic high signal activating one corresponding unit feature membership function generator to generate a plurality of unit memberships with respect to the target modes.

3. The fuzzy logic recognition device as claimed in claim 2, wherein each of said membership function generators is implemented by a membership function generating circuit including a PMOS model transistor, a plurality of PMOS mirror transistors, and an NMOS control transistor with its gate electrode controlled by the output of the corresponding feature extraction window means, its source electrode connected to ground, and its drain electrode connected to the gate and drain electrodes of said model transistor, said model and mirror transistors being connected in parallel with their source electrodes connected to a power source and their gate electrodes connected together, and the channel lengths and the channel widths of said mirror transistors being respectively adjusted with respect to the channel length and the channel width of said model transistor, so that the mirror currents presented at the drain electrodes of said mirror transistors can represent the memberships of the corresponding feature with respect to the target modes.

4. The fuzzy logic recognition device as claimed in claim 3, further comprising a current-to-voltage converter coupled to said maximum gate means in order to convert the current mode of the output of said maximum gate into a voltage mode.

5. The fuzzy logic recognition device as claimed in claim 4, wherein said predetermined features are represented in binary form.

6. The fuzzy logic recognition device as claimed in claim 5, further comprising means, coupled to said maximum gate means, for receiving a threshold current to be compared with said memberships in said maximum gate means, and said maximum gate means outputting logic "0" signals to indicate that the recognition is rejected when said memberships are all smaller than said threshold current.

7. The fuzzy logic recognition device as claimed in claim 2, wherein each of said unit feature membership function generators is implemented by a membership function generating circuit including a PMOS model transistor, a plurality of PMOS mirror transistors, and an NMOS control transistor with its gate electrode controlled by the output of the corresponding NOR gate, its source electrode connected to ground, and its drain electrode connected to the gate and drain electrodes of said model transistor, said model and mirror transistors being connected in parallel with their source electrodes connected to a power source and their gate electrodes connected together, and said mirror transistors having the same channel length and the channel width, so that the mirror currents presented at the drain electrodes of said mirror transistors can represent the unit memberships with respect to the target modes.

8. The fuzzy logic recognition device as claimed in claim 7, further comprising a current-to-voltage converter coupled to said maximum gate means in order to convert the current mode of the output of said maximum gate into a voltage mode.

9. The fuzzy logic recognition device as claimed in claim 8, wherein said predetermined features are represented in binary form.

10. The fuzzy logic recognition device as claimed in claim 9, further comprising means, coupled to said maximum gate means, for receiving a threshold current to be compared with said memberships in said maximum gate means, and said maximum gate means outputting logic "0" signals to indicate that the recognition is rejected when said memberships are all smaller than said threshold current.

* * * * *